Feb. 19, 1946.  A. C. RICHARDSON  2,395,067
METHOD OF PROPORTIONING VITAMIN CARRYING MEDIUM IN A FOOD PRODUCT
Filed Oct. 27, 1942
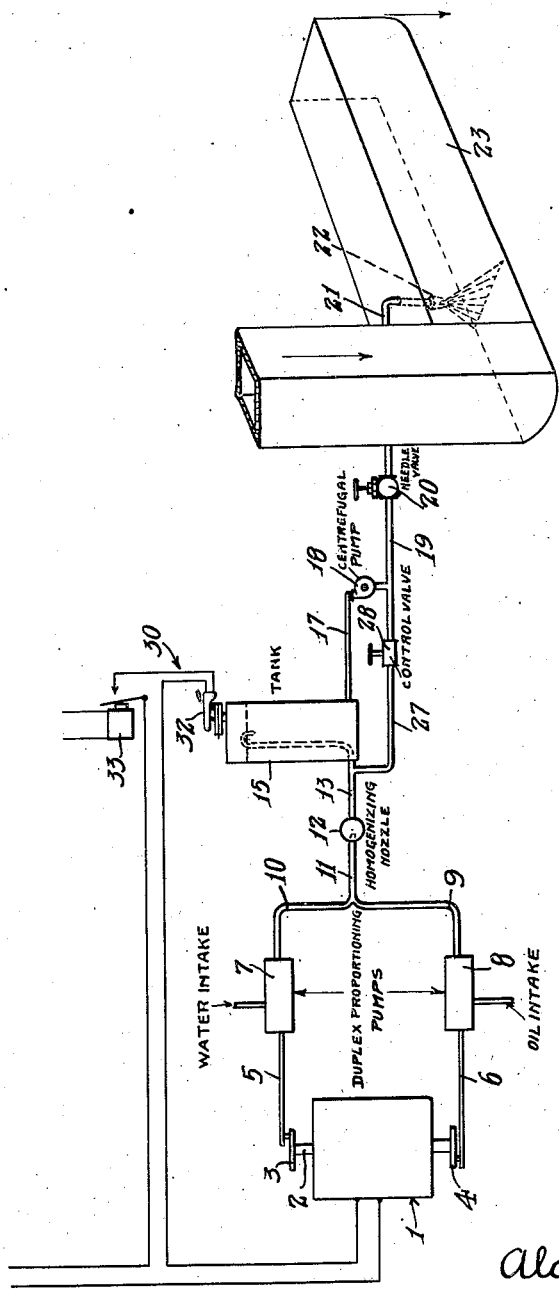
Inventor
Alan C. Richardson
By Lyon+Lyon
Attorneys Patented Feb. 19, 1946

2,395,067

UNITED STATES PATENT OFFICE 2,395,067

METHOD OF PROPORTIONING VITAMIN CARRYING MEDIUMS IN FOOD PRODUCTS

Alan C. Richardson, Berkeley, Calif., assignor to California Packing Corporation, San Francisco, Calif., a corporation of New York Application October 27, 1942, Serial No. 463,550

7 Claims. (Cl. 99—11)

This invention relates to the method and apparatus for proportioning a vitamin carrying medium in a food product, and is more particularly directed to the provision of a method and apparatus for distributing vitamin carrying oils of comparatively high concentration in a food product such as a feed for fowl, cattle, horses or the like to insure uniform distribution of the vitamins of such oil throughout the feed or fodder.

In the fortifying of feeds or fodder for fowl, cattle, horses or the like, particularly with such vitamins as vitamin D and vitamin A, it has been the practice to fortify such feeds using a mixture of relatively low vitamin concentration which enables the vitamin to be dispersed through the feed in the relatively large quantity of carrier, or oil.

When using a large volume of carrier, vitamins may be easily dispersed through the feed by a simple mixing operation because the low concentration of vitamin in the large quantity of oil permits obtaining of a uniform distribution. The use of such large quantities of oil, however, is objectionable due to the fact that the oils ordinarily employed are what may be classified as drying oils, so that they have no value, or substantially no value, in the feed and merely tend to increase its cost.

The oils which have been commonly used as carriers are the fish and fish liver oils such, for example, as sardine oil and cod liver oil. These oils are relatively expensive in relation to their vitamin content and their value as oils is substantially lost when they are introduced into the feed.

It is therefore an object of this invention to provide a method and apparatus for the uniform dispersion of a highly concentrated vitamin bearing oil in a feed or fodder.

Another object of this invention is to provide a method of uniformly dispersing the high potency vitamin media through a feed or fodder or other food product which includes the forming of a temporary emulsion with a liquid, primarily water, to obtain a uniform dispersion of the high vitamin medium through the water so that uniform dispersion of the vitamin in the feed or food product may be had.

Another object of this invention is to provide a method of handling a high potency vitamin A or D medium, or vitamin A and D medium, which includes the steps of forming and dispersing a temporary emulsion throughout a moving food product.

Other objects and advantages of this invention it is believed will be apparent from the hereinafter contained description of the preferred embodiment thereof as the same is diagrammatically illustrated in the accompanying drawing.

In this application describing my invention as particularly adapted to the dispersion of high potency vitamin media through feed or fodder with particular reference to the feed for animals and fowl, it is to be understood that my invention is not limited to this use, but is capable of use for the dispersion of vitamins throughout any type of product or food where, in the ultimate product, it is desired to have uniform distribution of small volumes of vitamins or other nutrients in large volumes of food products.

In accordance with the method embodying my invention, I utilize a device for properly proportioning the mixture of the vitamin and its oil or other carrier which may include an emulsifying agent with a dispersing agent such as water. This proportioning device may be of any suitable form or construction and as herein illustrated, may be a duplex proportioning pump in which a motor 1 has its drive shaft 2 connected through a pair of adjustable crank discs 3 and 4 with the pump rods 5 and 6 of a pair of reciprocating pumps 7 and 8. The eccentricity of the cranks is adjustable in a manner well understood in this art by moving the crank pins toward or away from the center of rotation of the shaft 2, thereby closely regulating or proportioning the mixing accomplished by the pumps 7 and 8 which discharge through their pump lines 9 and 10 into a common discharge pipe 11. By the means of such a proportioning device, a very large volume of water may be used as compared with a small volume of vitamin carrier. For example, the mixture may contain upwards of 80 to 98% water and from 2 to 20% vitamin-laden oil, dependent upon the degree of concentration of vitamin in its carrier. Thus in the case of the natural vitamin D oils which are derived as, for example, from tuna livers extracted with oil, the final oil may be a 2000 unit vitamin D oil. The said oil may be mixed with 80% of water to form an emulsion, having a 400 unit vitamin D concentration which corresponds with the concentration commonly employed in fortifying feeds. Heretofore, in order to obtain the necessary dilution or reduction of concentration, it has been the practice in this art to add a fish or fish liver oil, such as sardine oil or cod liver oil, as a diluent.

As example of a more highly concentrated vitamin D oil is that of a 10,000 unit grade resulting from the extraction of some fish livers with a smaller quantity of oil. Such an oil may be emulsified with 96% water or may be proportioned with 96% water through the use of the duplex proportioning pump to yield a 400 unit mixture. If it is desired to reduce the concentration to that equivalent to the vitamin D concentration of cod-liver oil, i. e., 85 units per gram of cod-liver oil using the 10,000 unit vitamin D concentration of fish livers extracted with oil, it will be apparent that the proportioning device may be set so as to employ water in the ratio of 10,000 parts of mixture of water to 85 parts of such fish liver oil.

In a continuous mixing process, to obtain a proper mixing or distribution of such vitamin and its carrier, I prefer to pass the mixture from the duplex pump through a homogenizing nozzle 12 through a conduit 13. The conduit 13 delivers into a reservoir tank 15, being directed into the tank 15 immediately below the surface of the liquid therein as to obtain a continuous agitation of the water and vitamin carrier. The tank 15 is connected with a recirculation system constituting the conduit 17 which leads to a mixing or centrifugal pump 18, the discharge of which pump leads into a conduit 19. The conduit 19 extends to a needle valve 20 the discharge from which is connected through the conduit 21 to an atomizing or spray discharge orifice 22.

The spray nozzle 22 is located in the feed mixer 23, which mixer 23 may be of any of the common types used for mixing feed or foods.

The conduit 19 also has a return branch 27 which leads through a pressure control valve 28 back into the intake conduit 13 of the tank 15. Thus the centrifugal pump 18 continuously withdraws the mixture of vitamin and its carrier and water from the tank 15 and causes the same to recirculate into and from the tank to maintain a uniform homogeneous mixture. As the mixture of vitamin and its carrier and water are fed into the tank 15, the rate of withdrawal from the tank to the spray orifice 22 is determined by the rate of input of the proportioning pump and the corresponding adjustment of the needle valve 20 to maintain a fixed volume of mixture in the tank 15. Thus the mixture is at all times under substantially constant pressure and at all times under continuous mixing circulation, just that amount being withdrawn as is required to mix with the feed.

In mixing feeds it is often desirable to also mix in the feed certain other constituents in small proportion. For example, it is often desired to mix riboflavin concentrates into the feed, the usual proportion being of a few grams per ton of feed. This may easily be accomplished through the mixing and dispersing medium of my invention by dissolving or dispersing such soluble ingredients in the water before it is introduced into the water pump 7. As the water provides the medium for performing the uniform distribution of the very minute quantities of vitamin throughout the feed, it will also provide the medium for obtaining a uniform dispersion of the relatively small quantities of such other constituents as are desired or required in the feed.

In order to protect certain of the vitamins from deterioration or destruction when dispersed in a large volume of water, I may employ either an inert gas in the tank 15 or may add to the oil or the water a chemical agent suitable to protect the vitamin from oxidation. In the case of the use of the chemical reagent, it is preferable that such oxygen retardant be added to the water phase of the emulsion.

In some cases it may be desirable to employ an emulsifying agent to increase the uniformity of the mix or emulsion and the permanency of the emulsion in the tank 15. In this case any suitable emulsifying agent may be employed as, for example, adding to the oil or water a small percentage of emulsifying or wetting agent such as "Aersol." The use of a wetting agent is also advantageously employed as it increases the rate of absorption and adsorption of the emulsion by the relatively dry feed, thus bringing the vitamin into rapid contact with the protective substances normally present in cereal mixtures.

It will be apparent that the cost of dispersing the vitamin through a food product in accordance with my invention is reduced practically in proportion to the amount of water employed because the water is of negligible cost whereas the fish oils which have heretofore been employed for this purpose have cost 8 to 9 cents per pound.

The advantages of this invention are not in any way dependent upon the permanency of the emulsion formed as it is kept agitated until impinged on the feed. It is easy to form a temporary emulsion through which the phases are uniformly distributed but it has been found extremely difficult to form a stable emulsion of water and a fish oil containing the vitamins A and D which is not destructive to such vitamins if stored.

In order to advise the operator of any interruptions of the supply of temporary emulsion due to failure of the circulating system to continuously supply the temporary emulsion to the nozzle 2 to be sprayed into the feed, I provide a pressure alarm system diagrammatically indicated at 30 and connected in the electric circuit with the motor 1. In the event the circulation system fails to function properly or the nozzle 22 becomes clogged, the pressure will increase in the tank 15 operating to close the switch 32 which is operatively connected through the relay 33 to interrupt the current supply to the motor 1 and at the same time to ring an alarm or bell.

Having fully described my invention, it is to be understood that I do not wish to be limited to the details herein set forth, but my invention is of the full scope of the appended claims.

I claim:

1. A method of proportioning a vitamin oil in a food product which comprises a mixture of ingredients including at least one granular constituent which includes the steps of continuously proportioning a small volume of a vitamin oil in a large volume of a mixture liquid consisting primarily of water, dispersing the vitamin oil in the mixing liquid to form a temporary emulsion, and then continuously spraying the emulsion into the dry granular ingredient as the ingredient is being continuously moved and then mixing the emulsion with the food product.

2. A method of proportioning a vitamin oil in a granular food product which comprises continuously mixing a small portion of vitamin oil in a large portion of water, continuously circulating the mixture under pressure, withdrawing a portion of the continuously circulated and emulsified mixture, and spraying the emulsion into a continuously moving food product.

3. A method of proportioning a vitamin oil in a food product, which comprises a mixture of ingredients including at least one dry granular constituent which includes the steps of continuously proportioning a small quantity of vitamin oil into a large volume of water, forming a temporary emulsion of the vitamin oil in the water under pressure, and spraying the temporary emulsion into the said dry granular constituent, and then mixing the food product with the vitamin carrying emulsion.

4. In a method of proportioning a vitamin oil in a granular food product, which comprises continuously proportioning the vitamin oil in water, homogenizing the mixture of water and vitamin oil, continuously recirculating the mixture to maintain a temporary emulsion, and continuously withdrawing a portion of the temporary emulsion and spraying the same into the food product.

5. A method of dispersing vitamin D oil-bearing medium of high unit concentration in a granular food product which includes the steps of introducing said carrier oil into water, forming a temporary emulsion of the oil in the water to reduce the vitamin potency per unit of emulsion, and then continuously spraying the emulsion into the food product as the food product is moved under the spray.

6. A method of dispersing vitamin D uniformly in a granular food product, which comprises mixing a high content vitamin oil in water to form an emulsion, and then continuously spraying the emulsion into the food product, whereby any possibility of the emulsion to separate prior to dispersion in the food product is avoided.

7. In a process of dispersing vitamin D in a carrier in a granular food product, which comprises continuously moving the food product, continuously mixing a high vitamin content oil with water, forming a temporary emulsion of the vitamin carrying oil in the water to reduce the unit concentration of the vitamin D in the temporary emulsion, and then spraying the emulsion into the continuously moving food product.

ALAN C. RICHARDSON.